H. W. DARBY.
BATTERY.
APPLICATION FILED MAR. 31, 1910.

982,576.

Patented Jan. 24, 1911.

Witnesses
G. D. Roxburgh.
G. Thomson.

Inventor
H. W. Darby
By Fred B. Fulwiler
atty

H. W. DARBY.
BATTERY.
APPLICATION FILED MAR. 31, 1910.
982,576.
Patented Jan. 24, 1911.
2 SHEETS—SHEET 2.
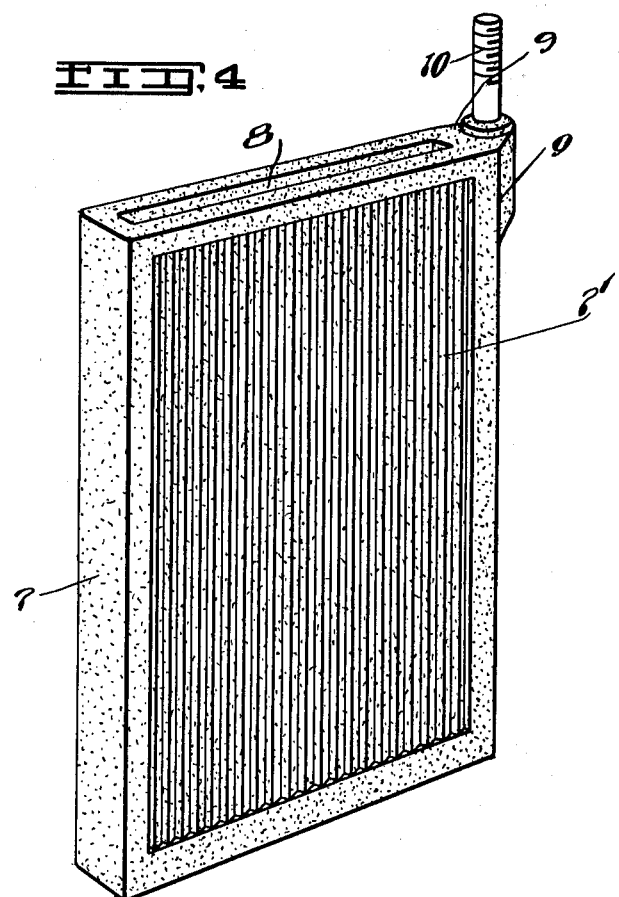
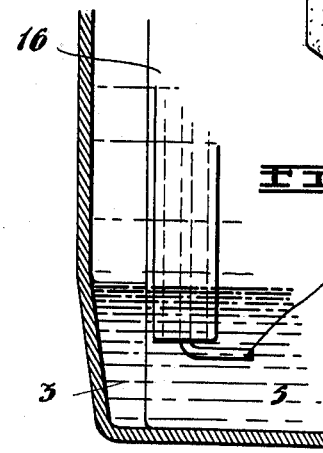
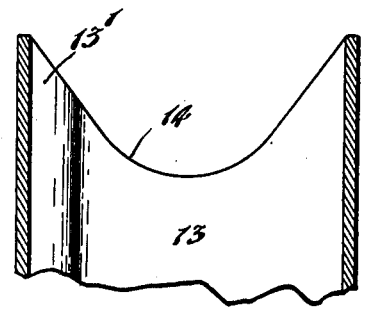
Witnesses
Inventor
H. W. Darby.

UNITED STATES PATENT OFFICE.

HARRY WILLIAM DARBY, OF WINNIPEG, MANITOBA, CANADA.

BATTERY.

982,576.      Specification of Letters Patent.      Patented Jan. 24, 1911.

Application filed March 31, 1910. Serial No. 552,729.

*To all whom it may concern:*

Be it known that I, HARRY WILLIAM DARBY, of the city of Winnipeg, in the Providence of Manitoba, Canada, have invented certain new and useful Improvements in Batteries, of which the following is the specification.

My invention relates to batteries and is more particularly directed to primary batteries.

It consists of certain novel constructions which will be hereinafter more particularly set forth and claimed.

Figure 1 is a side elevation of a complete battery certain parts being broken away to expose construction. Fig. 2 is a vertical sectional view taken in the plane denoted by the line X X', Fig. 1, and looking in the direction of the arrow. Fig. 3 is a plan view of the battery with the cover removed. Fig. 4 is an enlarged detailed perspective view of one of the electrodes. Fig. 5 is an enlarged detailed vertical sectional view through the bottom of the outer casing showing the manner in which the negative contact is made with the zinc plate. Fig. 6 represents an enlarged detailed vertical sectional view through a portion of the negative electrode showing the vertically directed groove formed therein.

In the drawings like characters of reference indicate corresponding parts in each figure.

1 represents the outside casing of the battery which is substantially rectangular in cross section and has an open top there being a portion 2 of the bottom projecting upwardly and forming a U-shaped receptacle 3 at the bottom of the casing.

4 represents the cover which is of any desired form and is adapted to fit over the top of the casing.

5 is mercury located within the U-shaped receptacle 3 and forming a contact with the negative electrode hereinafter referred to.

6 is a porous insulator having an open bottom which rests on the inwardly projecting portion 2 of the casing. Within the insulator I have inserted the porous carbon electrode 7 which is substantially rectangular in cross section and has a central cavity or pocket 8 provided therein to receive a liquid later referred to. The electrode has two of its faces 7' and 7² serrated so as to expose a large surface of the plate to the action of the liquid within the casing. It is also provided with an off-set portion 9 in which is firmly embedded a threaded post 10 which extends upwardly through a suitable opening provided in the cover and is provided with a thumb nut 12 at the upper end forming a binding post for the attachment of wire. It will be noticed that the carbon electrode is elevated above the level of the mercury.

13 is a zinc electrode which is U-shaped in cross section and has its lower end received within the U-shaped receptacle 3 and entering the mercury. The upper edge of the latter electrode is cut away at 14 so as to escape the offset portion 10 of the carbon electrode. The zinc electrode is formed with a vertically directed channel 13' located at one of its corners, the purpose of which will be more clearly apparent hereinafter.

15 are projecting strips extending within the casing and bearing against the outer face of the zinc plate thereby holding it in a set position.

16 is a glass or other such acid proof tube secured firmly at the top in any convenient way to the cover. The tube passes to the bottom of the casing and rests within the groove or channel 13' and has its lower end immersed within the mercury 5. Within the tube is a heavily insulated wire 17 which has its lower end 17' directly in contact with the mercury and below the level of the surface thereof, and its upper end connected in any suitable way to a binding post 18 whereby a delivery wire can be attached easily.

Two different liquids are used with the battery when complete, the one being placed within the porous carbon electrode 7 and the other between the outer walls of the carbon electrode and the casing.

The porous insulator serves to prevent any possibility of the battery short circuiting in cases where the zinc and carbon electrodes are fairly close together, as will be easily understood.

What I claim as my invention is:

A two flued battery comprising a casing having an upwardly projecting portion at the bottom thereof, thereby forming a U-shaped receptacle, a zinc U-shaped electrode having its lower end received within the receptacle and dipped in mercury located in the receptacle, a carbon electrode located on the upwardly projecting portion of the casing, said electrode being porous and containing one of the electrolytes, and an open ended porous insulator between the carbon and zinc electrodes, and resting on the projecting portion of the casing, the other electrolyte being between the carbon electrode and the casing.

Signed at Winnipeg in the Province of Manitoba, this 27th day of January 1909.

HARRY WILLIAM DARBY.

In the presence of—
G. S. ROXBURGH,
M. A. SOMERVILLE.